United States Patent [19]

Eckert et al.

[11] Patent Number: 4,606,586
[45] Date of Patent: Aug. 19, 1986

[54] BRAKE FORCE REGULATING SYSTEM

[75] Inventors: Konrad Eckert, Stuttgart; Franz Maurer, Schwieberdingen; Egbert Müller, Hochdorf; Werner Stumpe, Kornwestheim, all of Fed. Rep. of Germany

[73] Assignee: Robert Bosch GmbH, Stuttgart, Fed. Rep. of Germany

[21] Appl. No.: 556,248

[22] PCT Filed: Feb. 18, 1983

[86] PCT No.: PCT/DE83/00033
§ 371 Date: Nov. 15, 1983
§ 102(e) Date: Nov. 15, 1983

[87] PCT Pub. No.: WO83/03230
PCT Pub. Date: Sep. 29, 1983

[30] Foreign Application Priority Data

Mar. 15, 1983 [DE] Fed. Rep. of Germany ....... 3209314

[51] Int. Cl.$^4$ .......................... B60T 8/00; B60T 17/22
[52] U.S. Cl. ........................................ 303/93; 303/100; 303/DIG. 4; 303/97; 303/109
[58] Field of Search ................ 303/93, 95, 96, 103, 303/104, 105, 106, 107, 100, 108, 111, 119, DIG. 4; 188/181 A, 181 C; 364/426

[56] References Cited

U.S. PATENT DOCUMENTS

| 3,131,975 | 5/1964 | Smith et al. | 303/104 |
| 3,738,709 | 6/1973 | Stokes | 303/6 C |
| 3,980,344 | 9/1976 | Burckhardt | 303/119 |
| 4,131,325 | 12/1978 | Bayliss | 303/93 |
| 4,208,074 | 6/1980 | Ishigami | 303/6 C |
| 4,327,414 | 4/1982 | Klein | 303/108 |

FOREIGN PATENT DOCUMENTS

| 0045253 | 2/1982 | European Pat. Off. . |
| 1901467 | 8/1969 | Fed. Rep. of Germany . |
| 1655432 | 7/1970 | Fed. Rep. of Germany . |
| 1806671 | 7/1970 | Fed. Rep. of Germany . |
| 2057973 | 6/1972 | Fed. Rep. of Germany . |
| 2204092 | 8/1972 | Fed. Rep. of Germany . |
| 1544007 | 10/1968 | France . |
| 1591432 | 6/1970 | France . |
| 2235818 | 1/1975 | France . |
| 2396675 | 2/1979 | France . |
| 2413244 | 7/1979 | France . |
| 2436049 | 4/1980 | France . |
| 7104704 | 10/1971 | Netherlands . |
| 0585631 | 3/1977 | Switzerland . |
| 1018548 | 1/1966 | United Kingdom . |
| 1457377 | 12/1976 | United Kingdom . |
| 2053394 | 2/1981 | United Kingdom . |

Primary Examiner—Bruce H. Stoner, Jr.
Assistant Examiner—Alvin Oberley
Attorney, Agent, or Firm—Edwin E. Greigg

[57] ABSTRACT

A brake force regulating system for motor vehicles has a brake pedal, a brake regulator and transducers for ascertaining driving-situation variables which act upon the brake regulator. A desired value ($Z_s$) of the deceleration (Z) of the motor vehicle is prespecified by the brake pedal; the actual value is ascertained; and the brake regulator is regulated by the deviation between the desired value and the actual value. Furthermore a regulation is provided in accordance with the slip between the road surface and the wheel.

6 Claims, 9 Drawing Figures

BRAKE FORCE REGULATING SYSTEM

The invention is based on a brake force regulating system as generally defined by the preamble to the main claim.

In motor vehicle brake systems actuated by external or auxiliary force, the use of brake regulators which actuate the brake in accordance with specific driving situation variables of the motor vehicle is known.

For instance, it is known to provide load transducers on the axles of the motor vehicle and then with the transducer signals to perform a load-dependent regulation of brake force. A system of this kind is described in German laid-open application DE-OS No. 20 57 973, for instance.

It is furthermore known to provide so-called anti-skid braking systems (ABS), which if the wheels of the motor vehicle lock on a slippery road surface direct a braking pressure to the wheels at which the wheels are kept just below the locking threshold. An anti-skid braking system of such a kind is described, for example, in German examined application DE-AS No. 16 55 432.

Finally, regulating systems for so-called startup slippage have become known, in which the wheels of a motor vehicle are prevented from spinning, when starting up with excessive engine torque, by providing that the wheel brakes of the spinning wheels are triggered selectively. A regulating system of this kind is described in German Patent DE-PS No. 18 06 671, for example.

The feature common to these known systems is that the brake force is in principle regulated without regard to the driver's wishes. The regulation in these cases is instead effected exclusively in accordance with prespecified vehicle data (load-dependent regulation) or with the attainment of specific driving situations (anti-skid braking system, startup slippage regulation), so that the wish of the individual driver is not taken into consideration.

In conventional braking, the driver specifies a specific desired deceleration of the motor vehicle. This wish of the driver is converted in a controlled manner to a brake force, and the effect of the brake force in the form of an actual deceleration is fed back via a feedback loop of which the driver is also a part. From the actual effect of the brake force which he has prespecified, the driver ascertains whether the established brake force is sufficient or should be increased or decreased. This inclusion of the driver in the regulating loop represents a further burden on the driver, however, in addition to the one of always having to evaluate the general driving situation of the motor vehicle.

ADVANTAGES OF THE INVENTION

The brake force regulating system according to the invention and having the characteristics of the main claim has the advantage over the prior art that the driving situation variable prespecified by the driver, that is, the deceleration of the vehicle or the adhesion force at one or more wheels is established in a closed regulating loop without including the driver. The driver is accordingly relieved and can thus devote his full attention to the actual driving situation.

As a result of the provisions disclosed in the dependent claims, advantageous further developments of and improvements to the brake force regulating system disclosed in the main claim are attainable.

In a preferred embodiment of the invention, the forces arising in the wheel suspensions are ascertained via transducers, and from these forces the vertical and horizontal forces engaging the wheels or axles are ascertained. In the case of decleration regulation, an axle-by-axle, load-dependent brake force regulation is attainable using these measured values; in all the systems according to the invention, the adhesion force at the wheels can be ascertained from these measured variables, and thereby either a regulation of adhesion force per se or generally a regulation to a prespecified difference in the adhesion force at the individual axles can be performed. Given a regulation of adhesion force per se, a further load-dependent brake force regulation can be dispensed with.

Finally, suitable testing means for the supply pressure of the axle-by-axle brake force regulating systems are provided, so that even if a pressure supply fails, reliable braking is assured by the appropriate adaptation of the pressure at the supplied axle.

Further advantages will be apparent from the description and the accompanying drawing.

DRAWING

The invention is illustrated in the drawing and is explained in greater detail in the ensuing description. Shown are:

FIG. 1, a representation of the principles of a brake regulating loop according to the prior art;

FIG. 2, a representation of the principles of a brake regulating loop according to the invention;

FIG. 3, a simplified block circuit diagram of one form of realization of a brake force regulating system according to the invention;

FIG. 4, a schematic illustration to explain the forces effective at one wheel or at one wheel suspension;

FIG. 5, a complete block circuit diagram of one form of realization of a brake force regulating system according to the invention;

FIGS. 6-8, diagrams pertaining to adhesion force, deceleration and distribution of brake force, serving to explain the block circuit diagram shown in FIG. 5; and FIG. 9, a block circuit diagram of a further form of embodiment of a brake force regulating system according to the invention.

DESCRIPTION OF THE EXEMPLARY EMBODIMENTS

Figure 1:
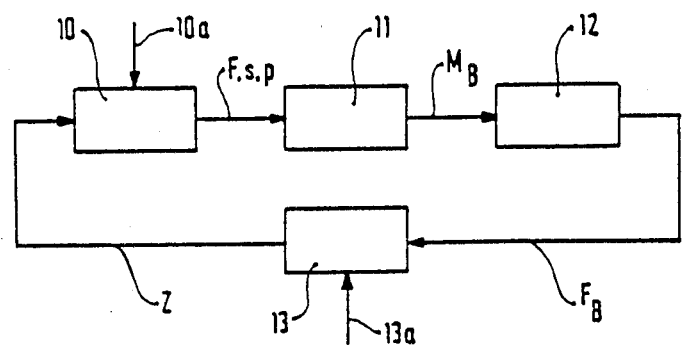

In the regulating loop shown in FIG. 1, 10 indicates the driver of a motor vehicle, who prespecifies a braking pressure p by means of an actuation force F and/or an actuation travel s. The triggered brake 11 exerts a braking moment $M_B$ upon a wheel 12, as a result of which a brake force $F_B$ is exerted upon the vehicle 13. The brake force $F_B$ makes itself felt in the form of a deceleration Z, which is in turn noted by the driver. Now while on the one hand a driving situation 10a is having its effect on the driver 10, the vehicle 13 is exposed to disturbances 13a, for instance from the road, the vehicle itself or the like. If the driver now wishes to brake, in view of a particular driving situation 10a, he prespecifies one of the variables F, s and thus p and checks whether the deceleration Z that is established corresponds to the driving situation 10a. As he does so, the disturbances 13a must also be taken into consideration, such as the slipperiness of the road surface, the vehicle load and the like. In braking of this kind, the driver 10 is thus always included in the regulating loop, so that he must devote part of his attention to regulating the deceleration Z.

Figure 2:
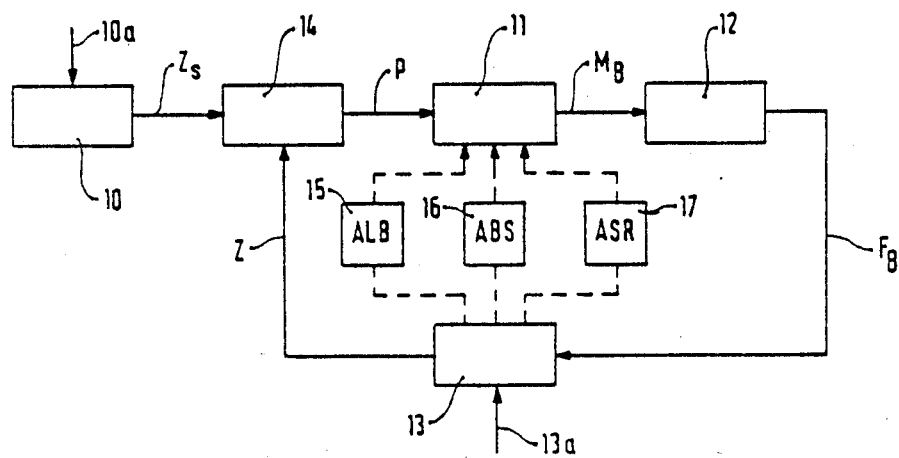

In contrast to the above, a separate brake regulator 14 is provided in the regulating system according to FIG. 2; in this regulator, a variable prespecified by the driver 10 is compared with the variable actually being established, and the brake 11 is adjusted in a closed regulating loop in such a manner that the variable prespecified by the driver is in fact established. If for instance the driver prespecifies a desired deceleration $Z_s$, the deviation between the actual deceleration Z and the desired deceleration $Z_s$ is ascertained in the regulator 14 and the brake 11 is actuated in accordance with this difference. The same applies to the prespecifying and establishment of a road/tire adhesion force ($\mu$).

Although self-actuating brake force regulating systems are already known, such as load-dependent brake force regulators (ALB) 15, anti-skid brake systems (ABS) 16 or start-up slippage regulating systems (ASR) 17. However, these known regulating systems merely close the regulating loop between the brake, wheel and vehicle, and predominantly for borderline situations (ABS, ASR), without the value prespecified by the driver at a given time, in particular deceleration in normal braking situations, being taken into consideration.

Figure 3:
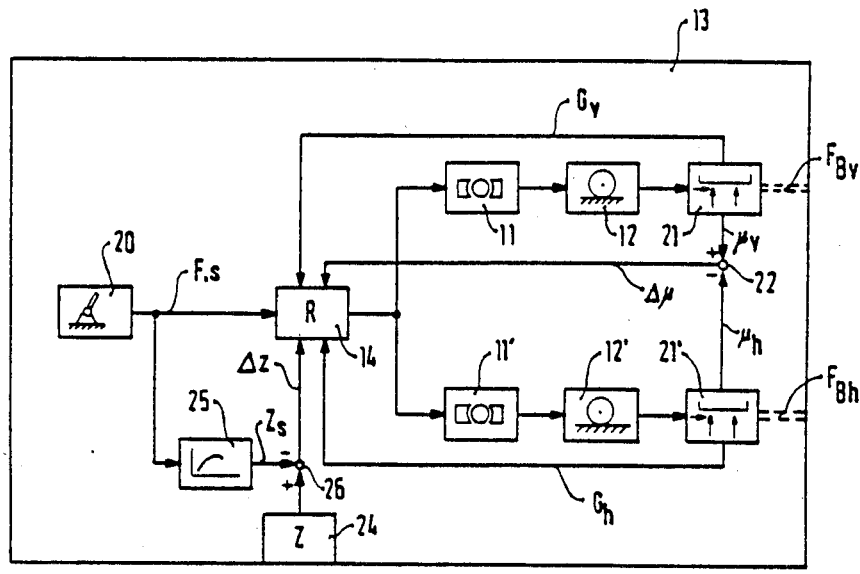

The simplified block circuit diagram shown in FIG. 3 shows the model of a regulating system according to the invention. The vehicle is again marked 13 and has a brake pedal 20, which acts upon the regulator 14. The regulator 14 controls a two-axle braking system, comprising the brakes 11, 11', the wheels 12, 12' and respectively associated suspensions 21, 21'. In the suspensions 21, 21', which transmit the braking forces $F_{Bv}$, $F_{Bh}$ to the vehicle, the adhesion force $\mu_v$, $\mu_h$ at a given time is ascertained and the adhesion force difference $\Delta\mu$ is ascertained in a first summing point 22 and likewise supplied to the braking regulator 14. The same is true for axle loads $G_v$ and $G_h$ ascertained in the suspensions 21, 21'. The position of the brake pedal 20 is converted in a first desired-value stage 25 into a desired deceleration $Z_s$, which is compared in a second summing point 26 with the actual deceleration Z, which is ascertained via a vehicle deceleration transducer 24 or via wheel rpm transducers with differentiating stages following them.

The mode of operation of the system shown in FIG. 3 is as follows:

While a variable F or s is prespecified by the brake pedal 20 solely as a base variable for the braking regulator 14, the actual braking regulation is performed via the second summing point 26 by comparing the desired deceleration value with the actual value. Naturally it is also possible to dispense with influencing the braking regulator 14 directly by the brake pedal 20 and to trigger the braking regulator 14 solely in accordance with the difference $\Delta_2$ between the deceleration values. Additionally, an axle-by-axle, load-dependent regulation is performed via the variables $G_v$, $G_h$. Finally, the brake force at the axles, for instance the front and rear axle, can be adjusted via the first summing point 22 in such a manner that a predetermined difference $\Delta\mu$ of the adhesion force at the front and rear axles is established.

Figure 4:
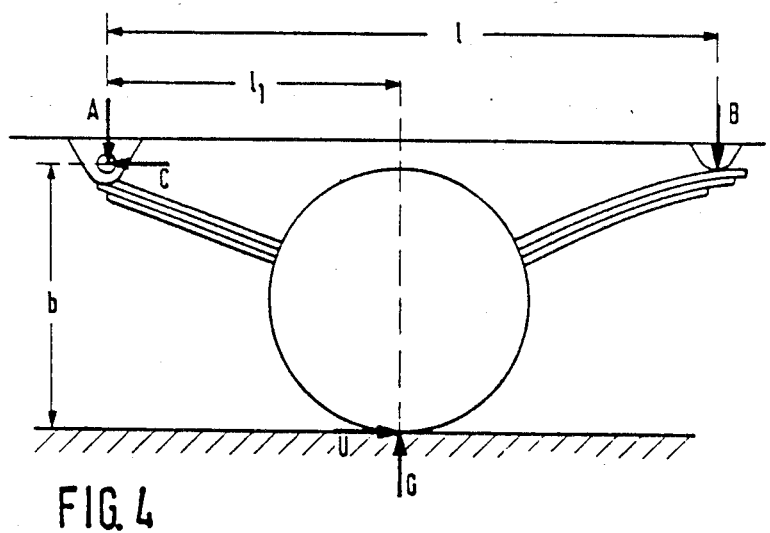

In FIG. 4 the horizontal force C and the vertical forces A, B of a suspension as well as the horizontal force U and the vertical force G, which act upon one wheel of a motor vehicle, are shown. Since the sum of the horizontal forces is equal to zero, then:

$$C - U = 0;$$

since the sum of the vertical forces is equal to zero, then:

$$A + B - G = 0.$$

Since the sum of the moments is likewise equal to zero, then finally, $$B1 - G1 - Ub = 0.$$

As can be readily understood, the following equation applies for the horizontal force U at the wheel:

$$U = B(1 - 1_1)/b - A\, 1_1/b.$$

The dimension b is known from the law of spring deflection.

Thus with the known geometry 1, $1_1$, b of the suspension or wheel and with known vertical forces A, B, the horizontal force U at the wheel can be ascertained. The axle load G is found in a simple manner from the sum of the vertical forces A and B. The forces U, G applied to the wheel can accordingly be ascertained by force measurement in the suspension (A, B) or (A, C) or at other locations between the introduction and the support.

Figure 5:
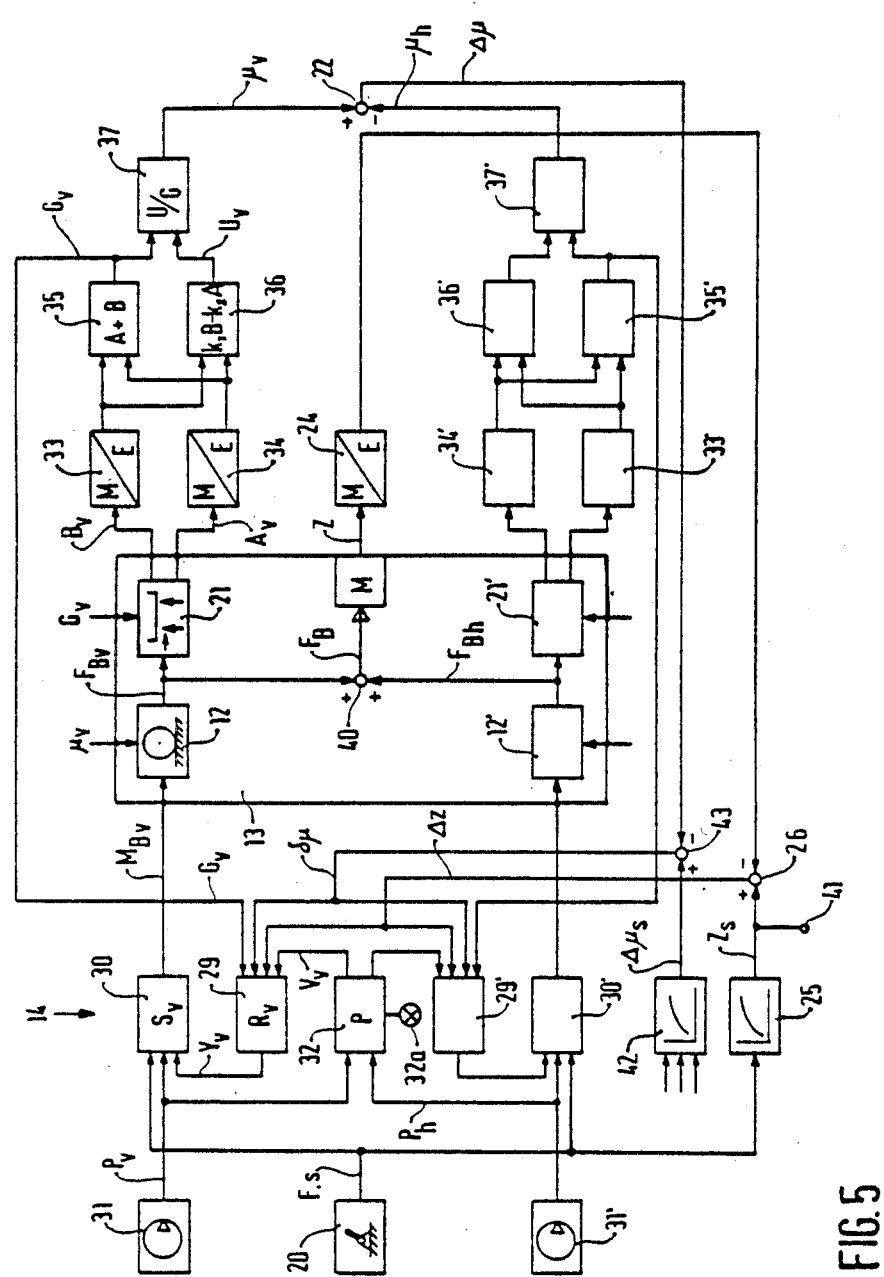

The above considerations are utilized in a brake force regulating system of the type shown schematically in FIG. 5. This brake force regulating system is again designed for two axles, for instance a front axle (subscript v) and a rear axle (subscript h). The elements of the rear axle are shown only schematically, for the sake of simplicity, and will not be described in detail below, since their function corresponds fully to the function of the front axle elements.

At the input side, the regulating system is acted upon by the brake pedal 20 as well as a pressure source 31, which act upon a final control element 30, which is also acted upon by a regulating stage 29. The brake pedal 20 furnishes an output variable F or s; the pressure source furnishes a supply pressure $P_v$; and the regulating stage 29 generates a regulating variable $Y_v$. The final control element 30 prespecifies a braking moment $M_{Bv}$ which acts upon the wheel 12 of the vehicle 13. Also acting upon the wheel 12 is the frictional force $\mu_v$, so that the overall result is a brake force $F_{Fv}$, which, like the axle load $G_v$, in turn acts upon the suspension 21 of the vehicle 13. The brake forces $F_{Bv}$ of the front axle or $F_{Bh}$ of the rear axle are added up in this model in a third summing point 40 and are exerted as a total brake force $F_B$ upon the mass M of the vehicle 13, resulting in the establishment of a deceleration Z, which is converted into an electrical signal in the vehicle deceleration transducer 24.

While the variables $\mu_v$, $G_v$ are imaginary variables, which in this model act upon the vehicle 13, the vertical forces $A_v$, $B_v$ are converted in a first and a second load transducer 33, 34 into corresponding electrical signals for further evaluation. This evaluation is performed on the one hand in a first computing stage 35, in which the vertical forces $A_v$, $B_v$ are added, so that the axle load $G_v$ is present at the output. On the other hand, in a second computing stage 36 the horizontal force $U_v$ at the wheel is ascertained via the above-derived relationship from the vertical forces $A_v$, $B_v$. The axle load $G_v$ is now supplied first to the regulating stage 29 and second, together with the horizontal force $U_v$, to a divider stage 37, in which the adhesion force $\mu_v$ is ascertained from the quotient of the horizontal and vertical forces. The values $\mu_v$, $\mu_h$ of the adhesion force of both axles are compared with one another in the first summing point 22. The difference value $\Delta\mu$ present at the output of the first summing point 22 is compared in a fourth summing point 43 with a desired difference value $\Delta\mu_s$ generated in a second desired-value stage 42 and the deviation $\delta\mu$ is delivered to the regulating stages 29, 29'.

The actual deceleration value Z from the vehicle deceleration transducer 24 is compared—as already explained above in connection with FIG. 3—in the second summing point 26 with the desired value $Z_s$, and the deviation is again delivered to the regulating stages 29, 29'. The desired value $Z_s$ is also applied to a terminal 41, by way of which further functions of the motor vehicle can be controlled.

Finally, a testing stage 32 is also provided, to which the pressure values $P_v$, $P_h$ of the pressure sources 31, 31' can be delivered. The testing stage 32 generates a signal $V_v$, which is delivered to the regulating stage 29 as its fourth input signal.

Figures 6, 7:
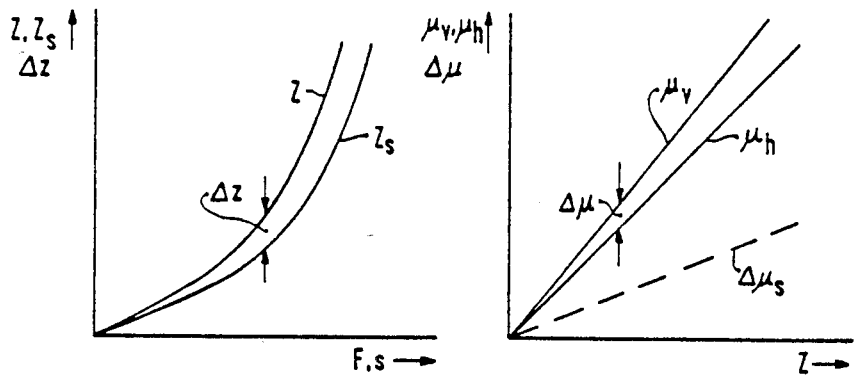
Figure 8:
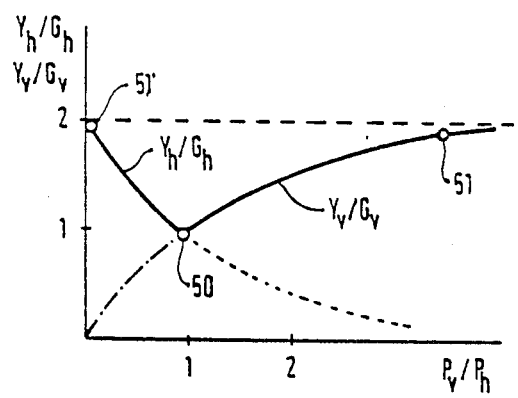

The mode of operation of the apparatus shown in FIG. 5 will now be explained, referring to FIGS. 6-8:

In FIG. 6, the respectively associated desired value $Z_s$ of the vehicle decleration is shown over the actuation variable for the brake pedal 20, for instance a force F or a travel s. If an actual vehicle deceleration Z is established, then a deviation of, for instance, $\Delta z$ results, which is applied by the second summing point 26 to the regulating stages 29, 29' in such a manner that the brake forces $F_{Bv}$, $F_{Bh}$ are varied, so that the total brake force $F_B$ is decreased or increased, depending on the algebraic sign (+ or −) of $\Delta z$.

In FIG. 7, the frictional force $\mu_v$, $\mu_h$ at the front and rear axles is plotted over the deceleration Z. The deviation $\Delta\mu$ established is ascertained in the first summing point 22 and can be compared in the fourth summing point 43 with a desired value $\Delta\mu_s$, so that the resultant deviation $\Delta\mu$ can be applied to the regulating stages 29, 29' in such a manner that the brake force ratio, that is, the quotient $F_{Bv}/F_{Bh}$, is decreased or increased. Naturally it is possible for various decelerations Z, to indicate different desired values $\Delta\mu_s$ of the adhesion force difference, as is shown by way of example in dashed lines in FIG. 7. By prespecifying a particular course of $\Delta\mu_s$, various vehicle configurations or types of tires can be taken into account.

The set point $\Delta\mu_s$ can also be influenced by various parameters, such as the load status or the like, as indicated at 42 in FIG. 5.

With the aid of FIG. 8, finally, the mode of operation of the testing stage 32 will be explained. The testing stage 32 has the task of becoming active, by triggering the regulating stages 29, 29', in those cases in which considerable deviations occur in the pressure values $P_v$, $P_h$ of the pressure sources 31, 31' and the desired deceleration is not obtained with the normal metering of braking force. For instance, if the pressure source 31' is defective and $P_h$ becomes equal to zero, then the testing circuit 32 establishes the factor $V_v$ in such a manner that via the regulating variable $Y_v$ and the final control element 30 a braking moment $M_{Bv}$ is established, which is proportional for instance to twice the axle load $G_v$, as indicated at 51 in FIG. 8, while during normal operation, in which $P_v=P_h$, the braking moment is proportional to the unmultiplied axle load $G_v$, as indicated in FIG. 8 at 50. The testing stage 32 thus brings about a brake force takeover by one axle, if the pressure supply at the other axle is too low. A display 32a indicates a reduction in the supply pressure.

Figure 9:
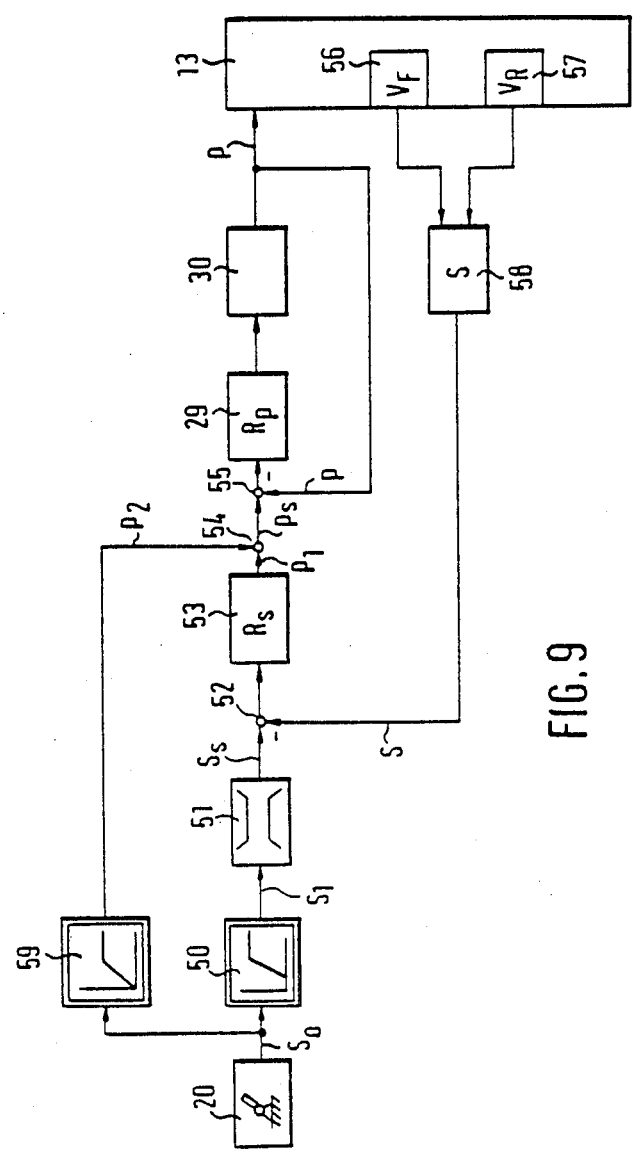

FIG. 9 is a block circuit diagram for a further form of embodiment of a brake force regulating system according to the invention, in which, as the prespecified driving situation variable which is to be regulated, the slip between the road and one or more vehicle wheels is provided. Via the brake pedal 20, a signal $S_o$ is generated, which is converted in a following characteristic-curve former 50 to the signal $S_1$ and after passing through the limiter 51 forms the desired value $S_s$ of the slip regulating loop. The comparison between the desired value and actual value of the slip regulating loop is formed at a fifth summing point 52, which is connected to a slip regulator 53. This element furnishes a desired value $p_1$ for the braking pressure, which is applied to a sixth summing point 54. Parallel to the slip regulating loop, a further desired pressure value $p_2$ is generated from the brake pedal signal $S_o$ via a further characteristic-curve former 59, and at the sixth summing point 54 this value $P_2$, together with $p_1$, forms a desired value $p_s$ for the following pressure regulating loop. The comparison between the desired value $p_s$ and the measured value p of the braking pressure is performed at a seventh summing point 55. This point is connected to the regulator 29 for the brake pressure, which in turn cooperates with the final control element 30. Present at the output of the final control element 30 is the brake pressure p which is delivered to the block marked 13, which is known to symbolize the vehicle together with its brakes, wheels and the adhesion grip with the road. Block 13 also contains further transducers 56 and 57 for the driving speed $v_F$ and for one or more wheel speeds $v_R$. These transducers 56, 57 are connected to a means of slip detection 58. The output of the final control element 30 is carried to an inverting input of the seventh summing point 55, and the output of the slip detector 58 is carried to an inverting input of the fifth summing point 52.

The mode of operation of the system shown in FIG. 9 is as follows:

In the above-described manner the brake pedal 20 prespecifies the desired value $S_o$ or $S_s$, which now corresponds with the wheel slip. The limiter 51 has the purpose of preventing the establishment of an excessively high desired value at which reliable driving characteristics are no longer assured. The function of the limiter 51 can thus correspond to the function of an anti-skid braking system known per se. The limiting value of the limiter 51 may be provided as adaptive; but of course it is also possible to prespecify the value either by hand to to set it as a fixed value. The desired value $S_s$ thus generated, and limited if needed, now travels to the fifth summing point 52, where it is compared with the actual value S of the wheel slip. This actual value is generated in the slip detector 58 from measured values provided by transducers, for instance by simply forming a difference or quotient of the vehicle and wheel speeds. The vehicle speed can be ascertained by one of the ways known per se, either by extrapolation of the wheel speeds or by one of the known methods for measurement over land using radar, ultrasound, infrared, correlation, calculation (integration) with the aid of the measured value for vehicle acceleration, or the like.

The difference between the desired and the actual value at the output of the fifth summing point 52 controls the slip regulator 53, which in a manner known per se may be embodied as a P, PI, or PID regulator, as a status regulator or as a mixture of these types of regulation. The slip regulator 53 furnishes at its output a partial desired value $p_1$ for the braking pressure to be effected. Since it is difficult to measure the wheel slip S precisely enough in the case of very gentle braking events, the slip regulating loop only begins to function at relatively hard brake actuations. This onset point, which may also be variable, is fixed by the characteristic-curve former 50. For gentle braking events, the brake pedal acts in a known manner, via the characteristic-curve former 59, upon the pressure regulating loop. The two characteristic-curve formers 50 and 59 may be nonlinear, in order to attain a smooth transition and to generate a predetermined braking characteristic for the vehicle. Via the sixth summing point 54, the two partial desired values $p_1$ and $p_2$ furnish the desired value $p_s$, which is then adjusted via the regulating stage 29 and the final control element 30; the actual brake pressure established, p, is compared with the desired value $p_s$ in the sixth summing point, so that the difference between the desired value and the actual value acts upon the regulating stage 29.

Overall, the system shown in FIG. 9 thus furnishes a continuous regulation, in which the wheel slip is adjustable in accordance with a prespecified value, which is in turn dependent on the position of the brake pedal. The system according to the invention thus differs fundamentally from known anti-skid brake systems, since in the latter systems action is taken only in an extreme situation if predetermined threshold values are exceeded, while the system according to the invention performs a continuous regulation over a wide range, even in non-critical driving situations. Such functioning in the non-critical range has the considerable advantage that load-dependent regulating means are thereby obviated, since the slip at the individual wheels is adjusted in a regulated way and load changes are in any case taken into account in the process.

The brake pressure regulating loop does not need to be highly precise, because the effect of the brake pressure on the wheel/road pair (i.e., slip) is regulated. Thus relatively inexpensive elements can be used for generating and measuring the brake pressure.

Since the force of actuation at the brake pedal corresponds with a slip value for the wheels, the driver is able to determine the status of the road and of his tire profile from the behavior of the vehicle. If the brake pressure is additionally indicated to the driver in display form, then it is also capable of ascertaining the status of the brake linings.

We claim:

1. A brake force regulating system including a fluid supply means for motor vehicles having at least one pair of axles comprising a brake pedal means (20,25), a brake regulator means (29,30) for establishing the braking moment ($M_B$) at the wheels of the motor vehicle, a plurality of transducers (24,33,34) for ascertaining driving-situation variables which act upon said brake regulator means, and comparing means (22,26,43) characterized in that a signal indicating a continuous desired value ($Z_s$) of a driving-situation variable can be prespecified by said brake pedal means, one (24) of said transducers ascertaining a driving-situation variable which represents an actual value (Z), and that the brake regulator means is controllable by said comparing means in accordance with the difference between the desired value ($Z_s$) and the actual deceleration value (Z), said comparing means (26) receives electrical signals from said one transducer (24) and said brake pedal means, other of said transducers (33,34) ascertaining forces (A, B, C) of the wheel suspension of said vehicle, means (42) for prespecifying a desired difference ($\Delta\mu_s$) between adhesion forces ($\mu_r$, $\mu_h$) at the axles, computing stages (35,36,37) operatively connected to said other transducers (33,34) for determining the horizontal and vertical forces (u,g) engaging the wheels as well as actual adhesion forces ($\mu_r$, $\mu_h$) at the axles of the motor vehicle wherein said comparing means (22,43) is operatively connected to said computer stages for determining an actual difference value ($\Delta\mu$) between the adhesion forces ($\mu_r$, $\mu_h$) at the axles and to said means (42) prespecifying a desired difference for determining the deviation ($\Delta\mu$) between said desired adhesion difference value ($\Delta\mu_s$) and said actual difference adhesion value ($\Delta\mu$) which serves to regulate brake pressure axle-by-axle.

2. A brake force regulating system as defined by claim 1, characterized in that a slip regulating loop desired value ($S_s$) is a slip value (S) for a slip between the road and at least one vehicle wheel (12).

3. A brake force regulating system as defined by claim 2, characterized in that transducer means for the vehicle speed ($v_F$) and the wheel speed ($v_R$) are provided and that a wheel slip detector ascertains the actual value of the slip (S) by comparing a desired braking pressure with a measured braking pressure.

4. A brake force regulating system as defined by claim 1, characterized in that a testing stage for influencing axle-by-axle regulating stages of the brake regulator means is provided, in which the brake pressure value transducers ($P_v$, $P_h$) of the fluid supply means for final control elements of the brake regulator means are compared and upon a drop in this brake pressure value transducer ($P_v$, $P_h$) for one axle the braking moment ($M_B$) effective at the other axle at that time is increased and the dropping of the supply pressure is indicated by a display means.

5. A brake force regulating system as defined by claim 1, characterized in that transducer means (56, 57) are provided which ascertain driving speed and the rotational speed of the vehicle wheels, that in the brake regulator means temporal deceleration derivations of the rpm signal are formed and the braking moment is thereafter adjusted.

6. A brake force regulating system as defined by claim 1, characterized in that a difference between a desired deceleration value ($Z_s$) and the deceleration (Z) of the motor vehicle is determined by said brake regulator means.

* * * * *